United States Patent [19]
Vezinet et al.

[11] Patent Number: 6,074,726
[45] Date of Patent: Jun. 13, 2000

[54] SECURITY CARD WITH OPTICAL TRACE

[76] Inventors: Alain Vezinet, 18 rue du Dr Calmette, 91200 Athis-Mons; Jean-Claude Moisand, 32 rue Baudin, 78390 Bois d'Arcy, both of France

[21] Appl. No.: 08/863,326

[22] Filed: May 27, 1997

[51] Int. Cl.[7] ........................................................ B32B 3/00
[52] U.S. Cl. ........................... 428/195; 428/402; 428/692; 428/913; 427/157; 427/162; 156/67
[58] Field of Search ................................. 428/423.1, 402, 428/913, 195, 692; 156/67; 427/157, 162, 164

[56] References Cited

U.S. PATENT DOCUMENTS 5,232,527   8/1993   Vernhet ...................................... 156/67

FOREIGN PATENT DOCUMENTS 0 773 507   5/1997   European Pat. Off. .

*Primary Examiner*—Elizabeth Evans
*Attorney, Agent, or Firm*—Herbert Dubno

[57] ABSTRACT

A process for authenticating a medium which can be solid or liquid in which particles of an organic composition capable of absorbing or reflecting infrared or near-infrared radiation are incorporated in the medium. The transparent or opaque state can be irreversibly selected upon heating to a temperature greater than ambient temperature or to ultraviolet radiation and, whether or not particles are opaque can then be determined.

11 Claims, 4 Drawing Sheets

SECURITY CARD WITH OPTICAL TRACE

FIELD OF THE INVENTION

Our present invention relates to a security card having an optical trace and, more particularly, to a process for authentication of a medium, usually a card for access, credit or identification, to the medium itself which is authenticatable, to a device for use with the card or process and to a reader for use with the process. The invention, more particularly, relates to the authentication of documents and other solid media, as well as liquid media which require verification as to identity.

BACKGROUND OF THE INVENTION

The need to protect documents and other media, both in solid form and in liquid form, against fraud has resulted in a wide variety of authentication systems. Cards with a magnetic trace, i.e. a magnetic strip carrying information, are widely used and such cards are frequently the subject of fraudulent endeavors. The code can be ascertained by imprudent use of the card in public or even in the case of private uses where access into communication of the information may make the code available. Modification of the coded information is likewise possible with equipment which can be available to unauthorized individuals. Hence a magnetic strip or trace on a document or card may not be sufficient to assure the authenticity thereof. Furthermore, the magnetic strips hitherto applied to cards tend to be sensitive to mechanical action and can be damaged, thereby preventing the card from communicating its code or from being authenticated by magnetic readers or the like.

OBJECTS OF THE INVENTION

It is, therefore, the principal object of the present invention to provide an authentication process which can assure greater security and reliability of authentication than earlier systems.

It is also an object of the invention to provide an improved authenticatable medium, usually a document or card which facilitates the improved process.

Another object of the invention is to provide an improved device for carrying out the process.

SUMMARY OF THE INVENTION

These objects and others which will become apparent hereinafter are attained, in accordance with the invention, in a process which involves incorporating in the medium to be authenticated, usually a document or card, but also possibly other solid objects or even liquid compositions, particles of an organic compound capable of absorbing or reflecting a radiation whose wavelength is located in the infrared or near-infrared range, and whose state can be reversed between a transparent state and an opaque state in an irreversible manner by heating to a temperature greater than ambient temperature or by exposure to ultraviolet rays, and determining the state, i.e. whether the particles are or are not opaque.

The process, therefore, can comprise the steps of:

incorporating in a medium to be authenticated particles of an organic composition capable of selectively absorbing and reflecting radiation of a wavelength in an infrared or near-infrared range and of a translumination state irreversibly switchable between transparent and opaque by heating to an elevated temperature above ambient temperature or exposure to ultraviolet; and determining authenticity of the medium by whether or not the particles are opaque at a time of determination.

By a wavelength located in the infrared or near-infrared range, we mean a wavelength comprised between about 0.7 and 1.2 μm.

The organic composition which can be used can, according to the invention, be a compound obtained by chemical reaction between an isocyanate and a compound having a hydrogen donor group, such as a polyetherdiol. The particles can be normally opaque or reflective to infrared radiation and can become transparent on heating or exposure to ultraviolet rays or, conversely can be normally transparent to infrared radiation becoming opaque or reflective upon heating or exposure to ultraviolet radiation.

The method according to the invention can be applied to any material, solid or liquid, for example, a document such as a bank note, a deposit ticket, an admission ticket generally, a transportation ticket or document or identity card or other identification papers, a textile article, a notarial, administrative, judicial, legal or financial document. It suffices to provide the particles for a limited zone of the document, for example, an optical trace or strip or patch.

The process equally can be used to provide improved security for an access authorization card, a card authorizing purchases (e.g. a credit card), where the improved card can afford better security than the magnetic strip cards heretofore widely used. In this case, the optical trace can be constituted by a transparent or translucent varnish in which the particles are incorporated. The card can be coded, the coding being obtained by heating the trace, e.g. locally, for example by a laser head, a thermal head or heated wires. The heated organic particles are modified as to the state of their transparency or nontransparency and, for example, the heated regions may become transparent to infrared radiation while the unheated particles continue to absorb or reflect the infrared radiation.

The reading of the card, document or like medium can be effected by interposing the optical trace between a source of infrared radiation and a detector or by so positioning the trace with respect to a source and detector of infrared radiation, that reflected rays can be captured by the detector. In this case, the source and the detector can be located on the same side of the trace. The coding can be equally obtained by locally subjecting the trace to ultraviolet rays which effect the switch over the transparency/opaque state of the particles.

The card of the invention can also be provided with a magnetic trace. The magnetic trace and the optical trace can be located side by side. Alternatively, the two traces can be superposed or even combined. In a combined trace, the organic particles can be incorporated into the magnetic trace. When the optical trace covers the magnetic trace, the varnish of the optical trace tends to fill irregularities in the surface of the magnetic trace and thus provides an external surface for the combined process of an extremely low roughness of the order of say, 10 nanometers. This ensures a better contact between the reading head for the traces and better reading of the magnetic trace to its support.

The addition of an optical code in accordance with the invention, detectable by infrared or near-infrared but otherwise invisible, to a magnetic code on the card considerably increases security.

The process of the invention can also be applied to a liquid in which the particles are incorporated. To determine if the liquid is authentic or not, it suffices to place several drops of the liquid on a transparent plate and to determine, after heating or exposure to ultraviolet radiation if the resulting assembly is or is not transparent to infrared radiation.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
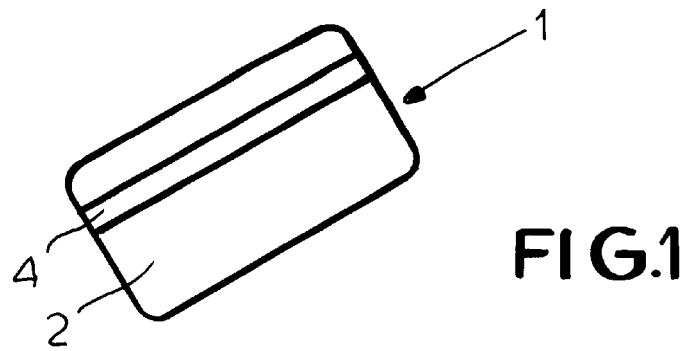
FIG. 1 is a perspective view of a security card according to the invention.
Figure 2:
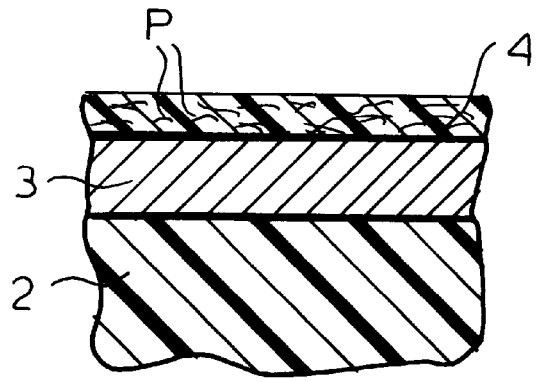
FIG. 2 is a transverse section through the card.

FIGS. 1 and 2 show a security card 1 which comprises a support 2 to which is applied the usual coded magnetic strip 3 covered by an optical strip or trace 4. The magnetic coded strip 3 is transparent to infrared rays and the optical strip 4 is constituted by a transparent and colorless varnish such as an acrylic or butyryl varnish in which has been incorporated 2 to 10% by weight of the composition of particles of an organic compound which has the properties of absorbing or reflecting infrared radiation and destructible by a thermal or photochemical effect. The particles are shown at P in FIG. 2.

The two strips are superimposed in the embodiment of FIGS. 1 and 2 and, if desired, the organic particles can be added to the magnetic strip or provided in a varnish strip disposed side by side with the magnetic strip. The organic composition can be, for example, the chemical reaction product of an isocyanate and polyetherdiol. To the organic compound can be added as well an inorganic additive capable or absorbing or reflecting infrared rays such as tin oxide or lithium oxide and, an identification marker such as sulfur which, by its spectrum, submits identification of the organic particles.

Figure 3:
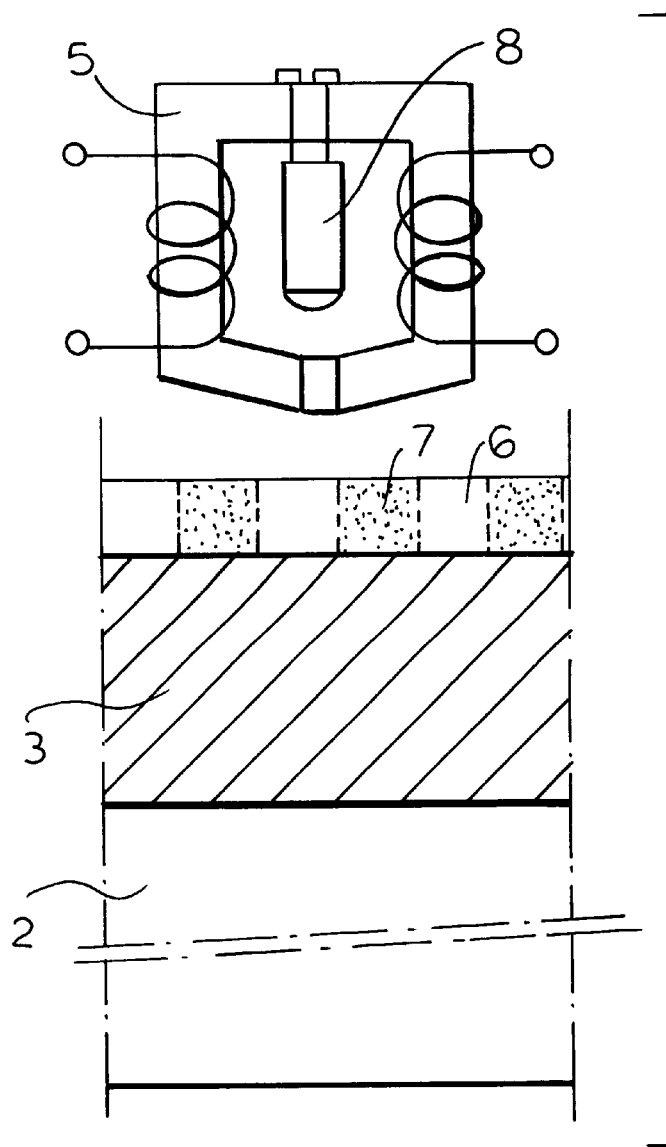
FIG. 3 is a diagrammatic cross sectional view showing how coding of the card can be effected.
Figure 4:
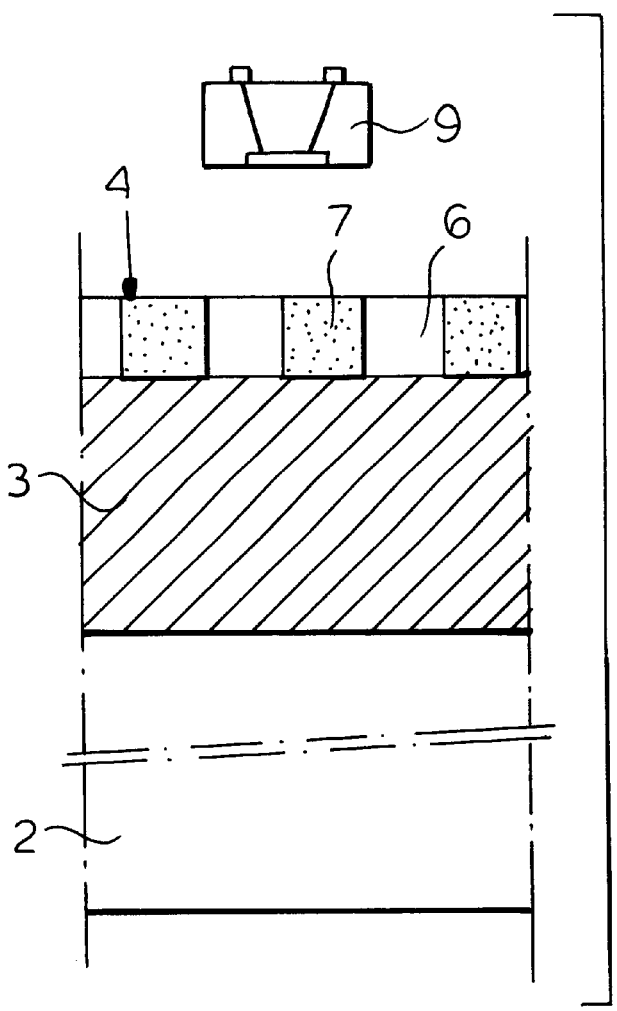
FIG. 4 is a view similar to FIG. 3 but illustrating a variant thereof.

The magnetic trace 3 is coded in the usual manner for reading by a magnetic reading and writing head 5. The coding of the optical trace 4 can be realized at the moment that this trace is deposited. One can equally form the optical trace in a continuous manner and generate the optical code by destroying, by heating to a temperature on the order of 125° C., or by subjecting selected zones to ultraviolet radiation. The coding zones which become transparent to infrared radiation have been represented at 6 while the zones which are not destroyed and contribute to the coding are represented at 7. For this purpose, a diode laser 8 can be incorporated into the magnetic head 5 (FIG. 3) or the layer 4 can be subjected to a thermal head comprising a heating resister, or to an ultraviolet source (FIG. 4).

Figure 5:
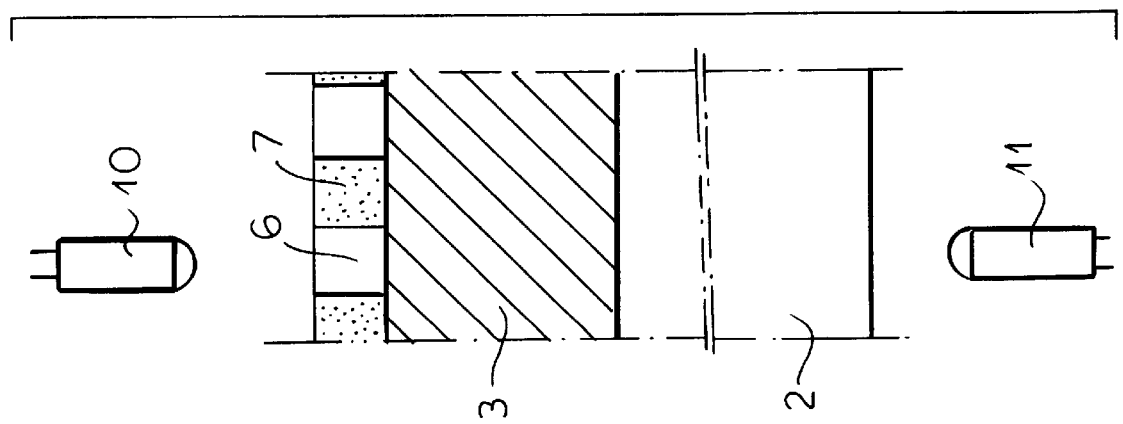
FIG. 5 is a cross sectional view in highly diagrammatic form showing how the optical trace can be read.

In order to read the coding of the optical trace 4, it suffices to introduce the trace between a photodiode 10 (FIG. 5), emitting infrared radiation, and a photodiode 11 (FIG. 5) collecting such information and generating an output representing same.

To destroy the optical coding the trace can be heated to destroy the particles in the zones which have not been previously destroyed to thus form a layer which is entirely transparent to the infrared radiation.

Figure 6:
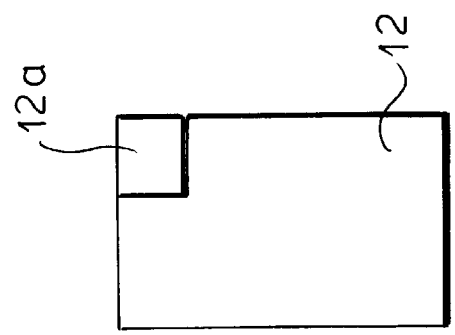
FIG. 6 is an elevational view of a document with an authentication patch in accordance with the invention.
Figure 7:
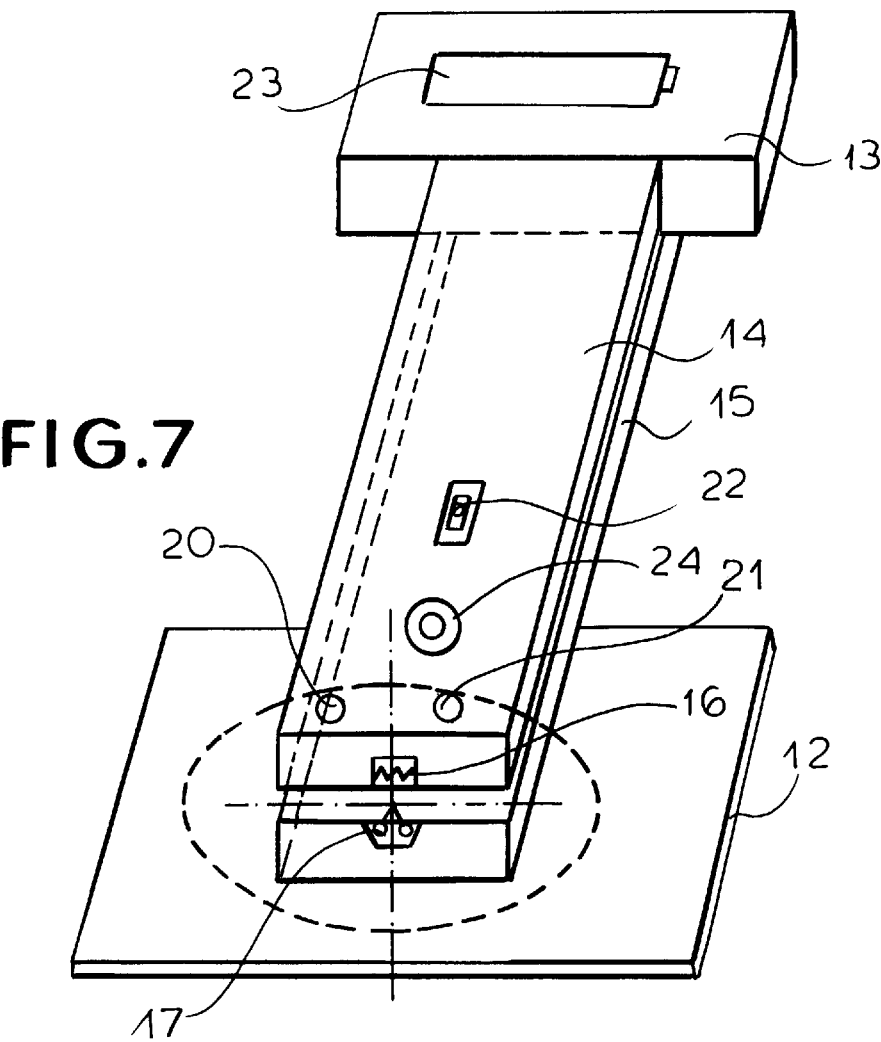
FIG. 7 is a perspective view of a device for carrying out the process of the invention.
Figure 8:
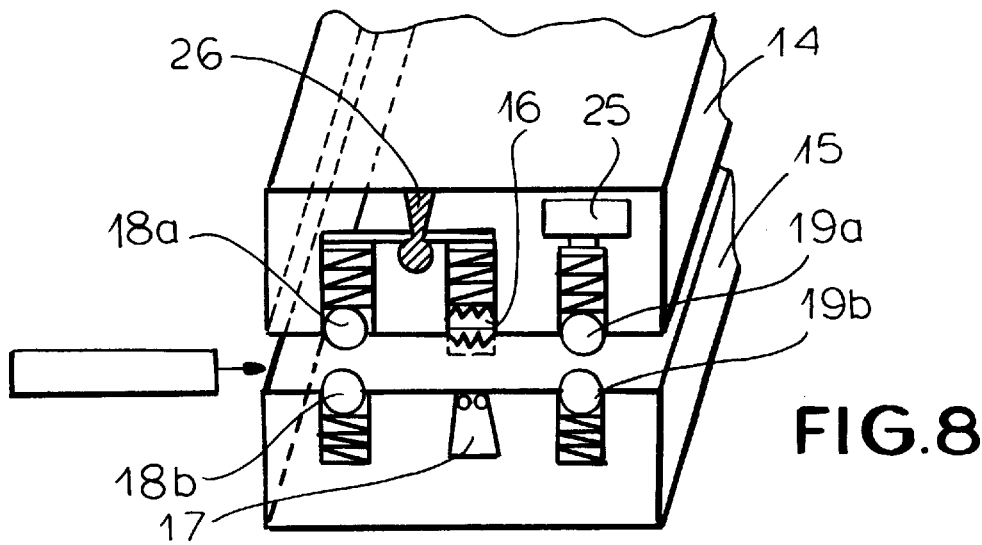
FIG. 8 is a detail view drawn to a larger scale of a portion of the device of FIG. 7.

FIG. 6 shows a document 12, for example, an identity card, a notarial document, or the like having a zone 12a or patch in which particles of the type described above have been incorporated and which allows authentication of this document. FIGS. 7 and 8 show a device which can be used for such authentication. The device comprises two elongated parallel jaws 14 and 15, slightly spaced one above the other, and extending from a body 13 with which the jaws are rigid.

At its end opposite the body 13, the jaw 14 comprises a heating resister 16 while the other jaw 15 is formed opposite the resister 16 with an infrared sensor 17. The jaws 14 and 15 also have ball switches mounted by springs 18a and 18b and 19a, 19b. These switches and the signal diodes 20 and 21 are connected by a logic circuit via an intermediary of a general switch 22, to a source of voltage 23 contained in the body 13.

In order to authenticate a medium like the document 12, the document is introduced between the jaws 14 and 15. The document is thus immobilized either automatically by the switches 18a, 18b, 19a, 19b or by manual action with the aid of the button 24.

The introduction of the document 12 causes:

Firstly, the energization of the feed sources 23 by the action of the ball 19a on the microswitch 25 to render the infrared receiver 17 operational. This receiver detects instantaneously, for example, the transparency state to infrared radiation of the document and immediately triggers signalling of this state by illuminating, for example, the red signal diode 21.

Secondly, the heater 16 is contacted with the document 12 by the action of switch 18a and the mechanism 26 connecting the switch 18a to the heating element 16. The element 16 until being rendered operational remains without voltage.

After an electronically-timed interval, of for example two seconds, the heating element 16 is quenched and modifies the particles in the zone juxtaposed with this device and transforming a transparent state to an opaque state with respect to infrared radiation, or conversely. The invention, it should be apparent, is not limited to the embodiments described but rather covers all variations thereof within the spirit and scope of the appended claims.

We claim:

1. An authenticatable medium which contains particles of an organic composition capable of selectively absorbing and reflecting radiation of a wavelength in an infrared or near-infrared range and of a translumination state irreversibly switchable between transparent and opaque by heating to an elevated temperature above ambient temperature or exposure to ultraviolet, and which is authenticatable by determining whether or not the particles are opaque at a time of determination, said particles being incorporated in a transparent or translucent varnish in an optical trace provided on a card for use selectively as an access authorization, credit and security card, said card further comprising a magnetic trace.

2. The authenticatable medium defined in claim 1 wherein said magnetic trace and said optical trace are side by side on said card.

3. The authenticatable medium defined in claim 1 wherein said optical trace covers said magnetic trace and an external surface of the traces on said card has a roughness of the order of 10 nanometers.

4. The authenticatable medium defined in claim 1 wherein said traces are combined, said particles being incorporated into the magnetic trace.

5. An authenticatable medium which contains particles of an organic composition capable of selectively absorbing and reflecting radiation of a wavelength in an infrared or near-infrared range and of a translumination state irreversibly switchable between transparent and opaque by heating to an elevated temperature above ambient temperature or exposure to ultraviolet, and which is authenticatable by determining whether or not the particles are opaque at a time of determination, said particles being incorporated in a transparent or translucent varnish in an optical trace provided on a card for use selectively as an access authorization, credit and security card, said optical trace containing an infrared absorbing or reflective additive selected from the group which consists of oxides of germanium, tin and lithium.

6. An authenticatable medium which contains particles of an organic composition capable of selectively absorbing and reflecting radiation of a wavelength in an infrared or near-infrared range and of a translumination state irreversibly switchable between transparent and opaque by heating to an elevated temperature above ambient temperature or exposure to ultraviolet, and which is authenticatable by determining whether or not the particles are opaque at a time of determination, wherein said Particles being incorporated in a transparent or translucent varnish in an optical trace provided on a card for use selectively as an access authorization, credit and security card, said optical trace containing an identification marker operating by its spectrum.

7. A process for authentication of a medium, comprising the steps of:

incorporating in a medium to be authenticated particles of an organic composition capable of selectively absorbing and reflecting radiation of a wavelength in an infrared or near-infrared range and between 0.7 and 1.2 $\mu$m and of a translumination state irreversibly switchable between transparent and opaque by heating to an elevated temperature above ambient temperature or exposure to ultraviolet; and determining authenticity of the medium by whether or not the particles are opaque at a time of determination.

8. The process defined in claim 7 wherein the particles are normally opaque or reflective to infrared and become transparent upon heating to said elevated temperature or exposure to ultraviolet.

9. The process defined in claim 7 wherein said particles are normally transparent to infrared and become opaque or reflective upon heating to said elevated temperature or exposure to ultraviolet.

10. The process defined in claim 7 wherein said organic composition is obtained by chemically reacting and isocyanate and a compound containing a hydrogen donor group.

11. The process defined in claim 10 wherein said compound containing a hydrogen donor group is a polyetherdiol.

* * * * *